United States Patent
Kall et al.

(10) Patent No.: US 10,880,740 B2
(45) Date of Patent: Dec. 29, 2020

(54) ACCESS MODE SELECTION BASED ON USER EQUIPMENT SELECTED ACCESS NETWORK IDENTITY

(71) Applicant: NOKIA SOLUTIONS AND NETWORKS OY, Espoo (FI)

(72) Inventors: Anders Jan Olof Kall, Espoo (FI); Gyorgy Tamas Wolfner, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/383,302

(22) PCT Filed: Feb. 19, 2013

(86) PCT No.: PCT/EP2013/053268
§ 371 (c)(1),
(2) Date: Sep. 5, 2014

(87) PCT Pub. No.: WO2013/131741
PCT Pub. Date: Sep. 12, 2013

(65) Prior Publication Data
US 2015/0026775 A1    Jan. 22, 2015

(30) Foreign Application Priority Data
Mar. 7, 2012  (WO) .............. PCT/EP2012/053922

(51) Int. Cl.
*H04W 12/06* (2009.01)
*H04L 29/06* (2006.01)
*H04W 12/00* (2009.01)

(52) U.S. Cl.
CPC .......... *H04W 12/06* (2013.01); *H04L 63/08* (2013.01); *H04L 63/0892* (2013.01); *H04L 63/205* (2013.01); *H04W 12/00516* (2019.01)

(58) Field of Classification Search
CPC .............. H04W 12/06; H04W 12/00516; H04L 63/08; H04L 29/06; H04L 63/0892; H04L 63/205
(Continued)

(56) References Cited

U.S. PATENT DOCUMENTS 6,477,156 B1 * 11/2002 Ala-Laurila ............ H04L 29/06
                                                    370/331
6,823,388 B1 * 11/2004 Philyaw ............ G06F 17/30722
                                                    235/453

(Continued)

FOREIGN PATENT DOCUMENTS

| EP | 2 200 358 A2 | 6/2010 |
|---|---|---|
| EP | 2400791 A1 | 12/2011 |
| WO | WO 2006/127445 A2 | 11/2006 |

OTHER PUBLICATIONS

International Search Report and Written Opinion dated May 31, 2013 corresponding to International Patent Application PCT/EP2013/053268.

(Continued)

*Primary Examiner* — Abu S Sholeman
(74) *Attorney, Agent, or Firm* — Squire Patton Boggs (US) LLP

(57) ABSTRACT

Access mode selection based on user equipment selected access network identity may be useful, for example, with respect to the authentication in third generation partnership project (3GPP) networks of subscribers attaching to a trusted wireless local area network (WLAN) access network (TWAN). A method of access mode selection can include informing, in a request, an authentication server regarding at least one access mode for a user equipment. The method can also include selecting a mode of the at least one access mode (Continued)

to use with respect to the user equipment based on a response received from the authentication server in response to the request.

13 Claims, 4 Drawing Sheets

(58) Field of Classification Search
USPC .................................. 726/1, 4, 12; 455/411
See application file for complete search history.

(56) References Cited

U.S. PATENT DOCUMENTS

| | | | |
|---|---|---|---|
| 8,126,145 B1* | 2/2012 | Tewari | H04L 9/0841 370/401 |
| 8,838,069 B2* | 9/2014 | Chakraborty | H04M 3/42238 455/411 |
| 8,965,338 B2* | 2/2015 | Luft | G06Q 30/0205 370/235 |
| 2003/0037147 A1* | 2/2003 | Matsubayashi | G06F 9/546 709/227 |
| 2003/0090998 A1* | 5/2003 | Lee | H04L 63/0272 370/229 |
| 2004/0181692 A1* | 9/2004 | Wild | H04W 48/14 726/4 |
| 2004/0192264 A1* | 9/2004 | Liu | H04W 12/06 455/414.1 |
| 2006/0045272 A1* | 3/2006 | Ohaka | H04L 9/3271 380/270 |
| 2006/0171537 A1* | 8/2006 | Enright | H04L 63/0428 380/270 |
| 2007/0064673 A1* | 3/2007 | Bhandaru | H04L 12/4633 370/351 |
| 2008/0060064 A1* | 3/2008 | Wynn | H04L 63/062 726/5 |
| 2008/0163310 A1* | 7/2008 | Fingerhut | H04W 8/26 725/62 |
| 2009/0070694 A1* | 3/2009 | Ore | H04W 12/08 715/764 |
| 2009/0300722 A1* | 12/2009 | Haverinen | H04L 63/08 726/4 |
| 2009/0305671 A1* | 12/2009 | Luft | G06Q 30/0205 455/411 |
| 2010/0014423 A1* | 1/2010 | Furuskar | H04W 74/02 370/235 |
| 2010/0091733 A1* | 4/2010 | Hahn | H04L 63/08 370/331 |
| 2010/0095368 A1* | 4/2010 | Niu | H04W 12/06 726/12 |
| 2010/0205425 A1* | 8/2010 | Takacs | G06F 21/32 713/100 |
| 2011/0142212 A1* | 6/2011 | Kim | H04L 12/2889 379/93.02 |
| 2012/0066717 A1* | 3/2012 | Park | H04W 12/06 725/39 |
| 2012/0178429 A1* | 7/2012 | Camps Mur | H04W 72/1215 455/418 |
| 2012/0317619 A1* | 12/2012 | Dattagupta | H04L 63/18 726/4 |
| 2013/0079041 A1* | 3/2013 | Kunugi | H04W 68/00 455/458 |
| 2013/0111549 A1* | 5/2013 | Sowatskey | H04L 63/0823 726/3 |
| 2014/0073288 A1* | 3/2014 | Velasco | H04W 12/06 455/411 |
| 2015/0222517 A1* | 8/2015 | McLaughlin | H04W 4/70 713/156 |
| 2016/0183162 A1* | 6/2016 | Jeong | H04W 40/22 370/311 |
| 2018/0227752 A1* | 8/2018 | Teyeb | H04W 12/003 |

OTHER PUBLICATIONS

3GPP TS 23.402 V11.1.0 (Dec. 2011); 3rd Generation Partnership Project; Technical Specification Group Services and System Aspects; Architecture enhancements for non-3GPP accesses (Release 11); pp. 1-232; 3rd Generation Partnership Project (3GPP); Mobile Competence Centre; 650, Route des Lucioles; F-06921 Sophia-Antipolis Cedex; France.

European Office Action dated Mar. 9, 2018, issued in corresponding EP Application No. 13705452.4.

European Office Action issued in corresponding European Patent Application No. 13 705 452.4-1218 dated Dec. 13, 2019.

* cited by examiner

ACCESS MODE SELECTION BASED ON USER EQUIPMENT SELECTED ACCESS NETWORK IDENTITY

BACKGROUND

Field

Access mode selection based on user equipment selected access network identity may be useful, for example, with respect to the authentication in third generation partnership project (3GPP) networks of subscribers attaching to a trusted wireless local area network (WLAN) access network (TWAN). More specifically, certain embodiments may be useful with respect to trusted WLAN access without user equipment (UE) impact (SaMOG_wlan) in section 16 of 3GPP TS 23.402 Release 11.

Description of the Related Art

In a conventional approach, during access authentication a TWAN forwards the service set identifier (SSID) to a 3GPP authentication, authorization, and accounting (AAA) server, and then the 3GPP AAA server based on the SSID and the subscriber profile can make the decision whether service and system aspects 2 a (S3a) access to Evolved Packet System (EPS) or non-seamless offload (NSO) is provided to the UE.

However, in this approach the TWAN has to send the access network identity, for example, the SSID, to the 3GPP AAA server and this would require modifications to the TWAN-AAA Server interface (STa).

Likewise, in this approach, the 3GPP AAA server must be configured to know all relevant SSID related information, despite the fact that there may be numerous different SSIDs in use in a big operator's network. A 3GPP operator may have agreements with WLAN operators to enable the operator's subscriber to access services via the WLAN operator's WiFi hotspot. Thus, this approach requires the configuration of the SSIDs used by the WLAN operator.

SUMMARY

According to certain embodiments, a method includes informing, in a request, an authentication server regarding at least one access mode for a user equipment. The method also includes selecting a mode of the at least one access mode to use with respect to the user equipment based on a response received from the authentication server in response to the request.

In certain embodiments, a method includes determining whether at least one access mode for a user equipment, received in a request, is permitted for the user equipment. The method also includes responding to the request with a successful authentication only when one or more mode of the at least one access mode is permitted for the user equipment.

A computer-readable medium, in certain embodiments, is encoded with instructions that, when executed in hardware, perform a process. The process includes informing, in a request, an authentication server regarding at least one access mode for a user equipment. The process also includes selecting a mode of the at least one access mode to use with respect to the user equipment based on a response received from the authentication server in response to the request.

A computer-readable medium, according to certain embodiments, is encoded with instructions that, when executed in hardware, perform a process. The process includes determining whether at least one access mode for a user equipment, received in a request, is permitted for the user equipment. The process also includes responding to the request with a successful authentication only when one or more mode of the at least one access mode is permitted for the user equipment.

An apparatus, according to certain embodiments, includes at least one processor and at least one memory including computer program code. The at least one memory and the computer program code are configured to, with the at least one processor, cause the apparatus at least to inform, in a request, an authentication server regarding at least one access mode for a user equipment. The at least one memory and the computer program code are also configured to, with the at least one processor, cause the apparatus at least to select a mode of the at least one access mode to use with respect to the user equipment based on a response received from the authentication server in response to the request.

An apparatus, in certain embodiments, includes at least one processor and at least one memory including computer program code. The at least one memory and the computer program code are configured to, with the at least one processor, cause the apparatus at least to determine whether at least one access mode for a user equipment, received in a request, is permitted for the user equipment. The at least one memory and the computer program code are also configured to, with the at least one processor, cause the apparatus at least to respond to the request with a successful authentication only when one or more mode of the at least one access mode is permitted for the user equipment.

According to certain embodiments, an apparatus includes informing means for informing, in a request, an authentication server regarding at least one access mode for a user equipment. The apparatus also includes selecting means for selecting a mode of the at least one access mode to use with respect to the user equipment based on a response received from the authentication server in response to the request.

In certain embodiments, an apparatus includes determining means for determining whether at least one access mode for a user equipment, received in a request, is permitted for the user equipment. The apparatus also includes responding means for responding to the request with a successful authentication only when one or more mode of the at least one access mode is permitted for the user equipment.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Certain embodiments of the present invention are related to authentication in networks, such as 3GPP networks, of subscribers attaching to a trusted WLAN access network (TWAN), more specifically to the solution specified for Trusted WLAN Access without UE impact (SaMOG_wlan) in section 16 of 3GPP TS 23.402 Release-11.

Figure 1:
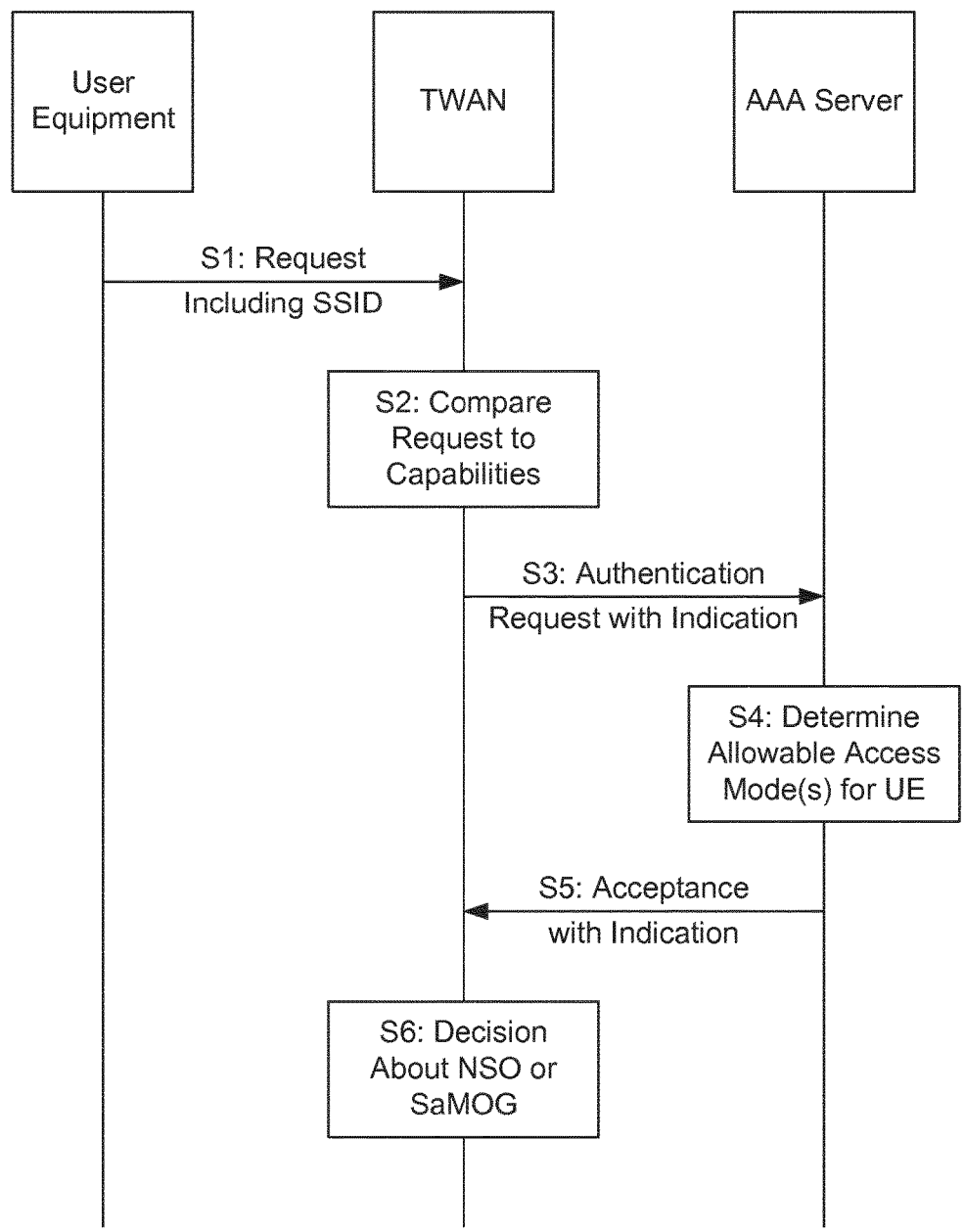
FIG. 1 illustrates a signal flow according to certain embodiments.

FIG. 1 illustrates a signal flow according to certain embodiments. This signal flow illustrates some of the signal exchanges that may occur, but it should be understood that other signal exchanges may also occur, which are not illustrated in the figure.

A user equipment (UE) can use a service set identifier (SSID) to indicate to the network if the UE would like to use a particular access type, such as non-seamless offload (NSO) or trusted WLAN access (SaMOG). For example, a UE at S1 can send a request to a TWAN, and that request can include access network identity, such as an SSID. A WiFi network can advertise (not shown in FIG. 1) "Operator_SaMOG" and "Operator_Offload".

The TWAN can, at S2, compare the request from the UE to the capabilities of the TWAN. Then, the TWAN can, at S3, send an authentication request with an indication regarding access network capability. This indication can be implemented various ways. For example, the indication may identify the same advertised capabilities of the TWAN. Alternatively, the indication may identify SaMOG or NSO, depending on what the UE requested in S1, and further depending on whether the TWAN supports what the UE has requested. Thus, depending on which one is selected by the UE, the network can provide NSO or SaMOG service to the UE.

More particularly, a network can provide NSO or SaMOG services to the UE depending on which SSID the user equipment (UE) has selected when attaching to the trusted WLAN access network. This decision can be taken by the AAA Server as informed by the TWAN during the authentication process. Alternatively, in accordance with certain embodiments, the AAA server can, at S5, respond to the TWAN's authentication request with an acceptance and indication of what, if any, access mode is permitted for the UE. To determine what access mode is permitted, the AAA server may, for example, query a Home Subscriber Server (not shown). However, once the AAA server has determined, at S4, whether the mode requested by the TWAN is permitted for the UE, the decision about which access mode to use can be made at S6 by the TWAN based on which access capability was allowed by the AAA Server.

The TWAN and AAA Server, which may be physically separate devices, can thus interoperate in an effective manner.

As mentioned above, the TWAN can include an indication of the TWAN's NSO and/or SaMOG capabilities when sending, at S3, the authentication request for a UE attaching to the trusted WLAN to the 3GPP AAA server. The indicated capabilities of the TWAN can be according to the possible services for the given SSID. Thus, for example, the indicated TWAN capabilities can depend on the SSID selected on the UE. For example, in certain embodiments if the UE selected SSID is "Operator_SaMOG" then the TWAN only indicates SaMOG capability to the 3GPP AAA server. In another alternative, the TWAN may query the AAA server regarding an access mode that has not specifically been requested by the UE. The TWAN could then offer this access mode, if the AAA server indicates it is permitted, to the UE.

In certain embodiments, a 3GPP AAA server only accepts the authentication/authorization request if the UE is allowed services that match the requested capabilities of the network. For example, if the UE requested NSO and the TWAN indicated NSO capability to the AAA server but NSO is not allowed for the user then the authentication fails in certain embodiments.

If the TWAN is capable of both NSO and SaMOG services for a given SSID and indicates both capabilities to the AAA server then there are several possibilities in certain embodiments. First, if the 3GPP AAA server sends back to the TWAN an indication that both NSO and SaMOG services are allowed for the UE, then the TWAN configuration can determine which one to select. This decision may be based on, for example, the current traffic situation in TWAN.

Alternatively, if the 3GPP AAA server selects only one capability, for example, only NSO or only SaMOG, then the AAA Server indicates to the TWAN the single service capability allowed for this UE. The AAA server can determine which capability to select based on subscriber information or AAA configuration.

In certain embodiments, therefore, there is no need to send the SSID to the 3GPP AAA server. Thus, there is no need to modify the STa interface between TWAN and AAA Server. Moreover, in certain embodiments there is no need to have any SSID related information in the 3GPP AAA server. Thus, it is not required for the AAA to handle SSIDs and consequently no need for the AAA server to need to know all possible SSIDs.

Figure 2:
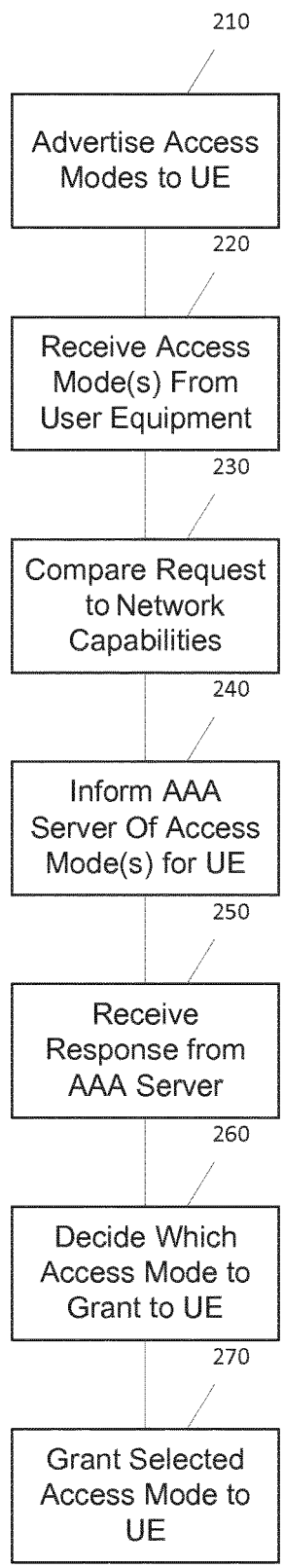
FIG. 2 illustrates a method according to certain embodiments.

FIG. 2 illustrates a method according to certain embodiments. As shown in FIG. 2, at 210 a TWAN can advertise supported access modes to devices such as user equipment. Then, at 220, the TWAN can receive an indication of one more access modes from the user equipment. Specifically, the TWAN can receive an access network identity from the user equipment. The access network identity can be or include a service set identifier.

The method can also include, at 230, comparing the information in the request to capabilities of the TWAN. If there is no overlap between the requested access mode(s) and the supported access mode(s), the TWAN can, as one alternative, decide to terminate the process without communicating with the AAA server.

If, however, at least one mode requested by the user equipment is supported by the TWAN, the TWAN can, at 240, inform an authentication server regarding at least one access mode for the user equipment. The TWAN can use an authentication request to inform a AAA server.

At 250, the TWAN can receive a response to the request. Then, at 260, the TWAN can decide which access mode to grant to the user equipment and select a mode of the at least one access mode to use with respect to the user equipment based on the response received from the authentication server in response to the request.

At 270, the method can additionally include granting the access mode to the user equipment when the authentication server indicates that the access mode is permitted for the user equipment.

Figure 3:
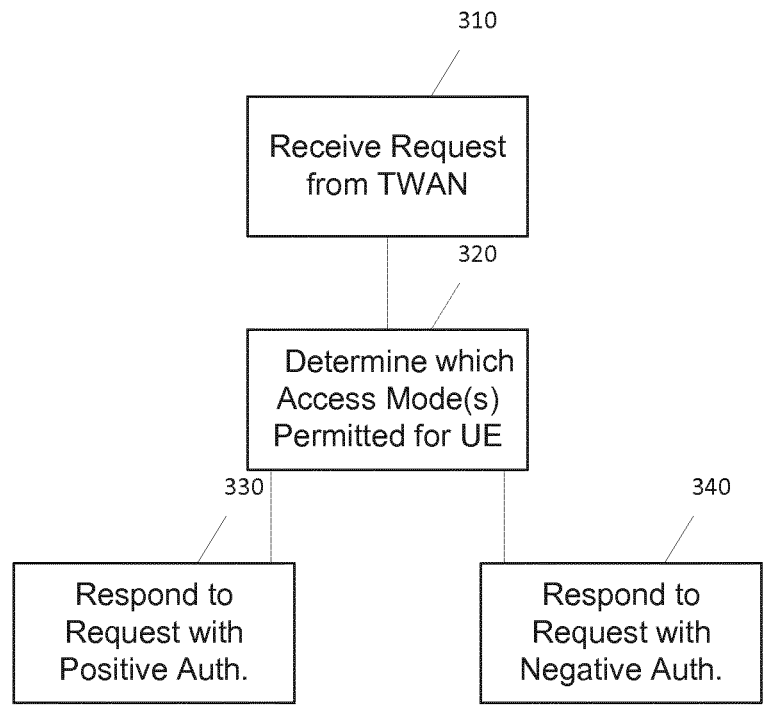
FIG. 3 illustrates another method according to certain embodiments.

FIG. 3 illustrates another method according to certain embodiments. As shown in FIG. 3, a method can include, at 310, receiving a request from a TWAN at a AAA server. The request can be or include an authentication request. The method can also include, at 320, determining whether at least one access mode for a user equipment, received in the request, is permitted for the user equipment.

The method can further include, at 330, responding to the request with a successful authentication only when one or more mode of the at least one access mode is permitted for the user equipment. The method can additionally include, at 340, responding to the request with an unsuccessful authentication when the AAA server has determined that no mode of the at least one access mode is permitted for the user equipment.

Figure 4:
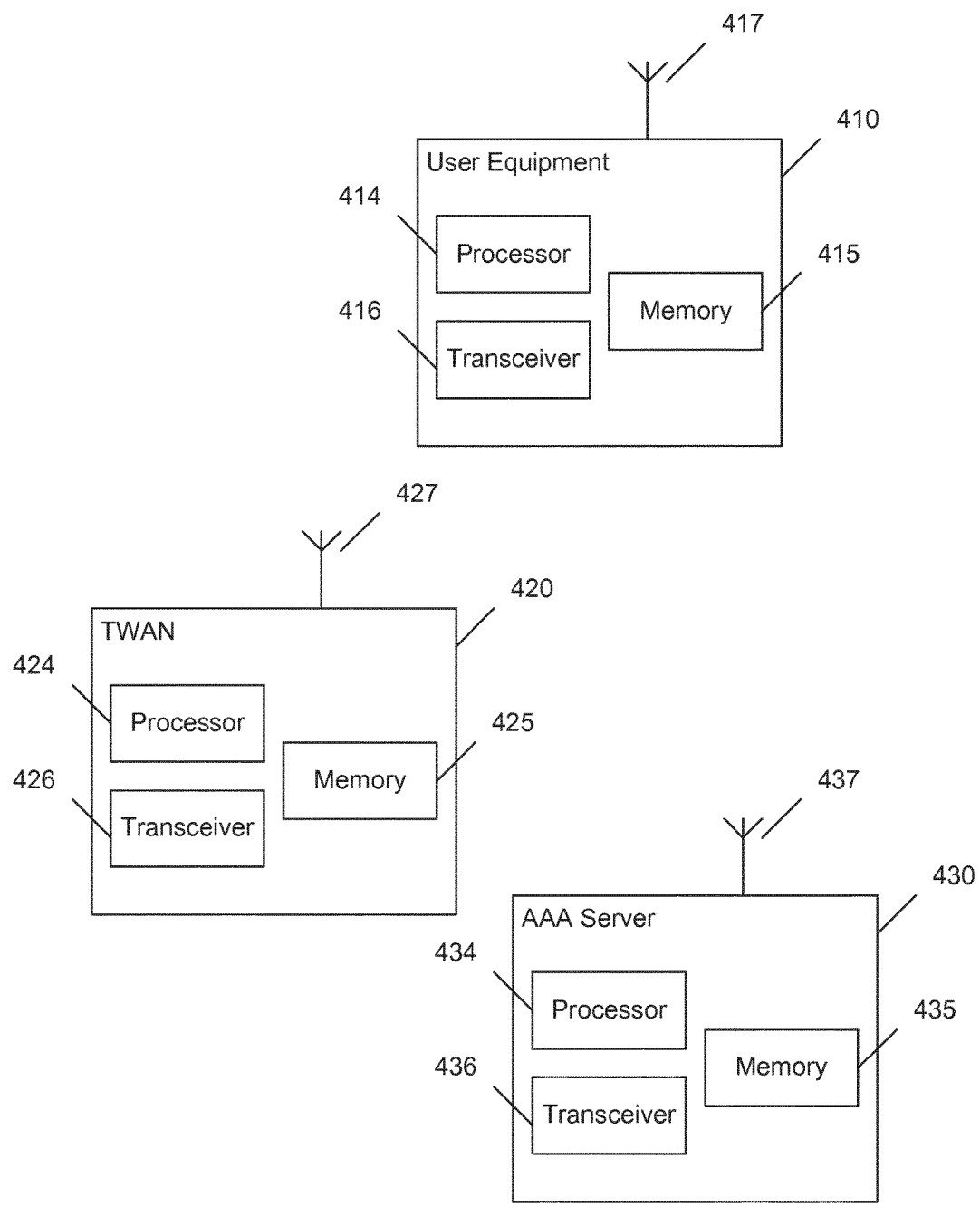
FIG. 4 illustrates a system according to certain embodiments.

FIG. 4 illustrates a system according to certain embodiments. In an example embodiment, a system may include three devices, user equipment (UE) 410, TWAN 420, namely a device of the TWAN, and AAA server 430. Each of the devices 410, 420, and 430 may be equipped with at least one processor (respectively 414, 424, and 434), at least one memory (respectively 415, 425, and 435) (including computer program instructions or code), a transceiver (respectively 416, 426, and 436), and an antenna (respectively 417, 427, and 437). There is no requirement that each of these devices be so equipped. For example, the AAA server 430 may be equipped solely for wired communication.

The transceiver (respectively 416, 426, and 436) can be a transmitter, a receiver, both a transmitter and a receiver, or a unit that is configured both for transmission and reception. The transceiver (respectively 416, 426, and 436) can be coupled to corresponding one or more antenna(s) (respectively 417, 427, and 437), which may include a directional antenna.

The at least one processor (respectively 414, 424, and 434) can be variously embodied by any computational or data processing device, such as a central processing unit (CPU) or application specific integrated circuit (ASIC). The at least one processor (respectively 414, 424, and 434) can be implemented as one or a plurality of controllers.

The at least one memory (respectively 415, 425, and 435) can be any suitable storage device, such as a non-transitory computer-readable medium. For example, a hard disk drive (HDD) or random access memory (RAM) can be used in the at least one memory (respectively 415, 425, and 435). The at least one memory (respectively 415, 425, and 435) can be on a same chip as the corresponding at least one processor (respectively 414, 424, and 434), or may be separate from the corresponding at least one processor (respectively 414, 424, and 434).

The computer program instructions may be any suitable form of computer program code. For example, the computer program instructions may be a compiled or interpreted computer program.

The at least one memory (respectively 415, 425, and 435) and computer program instructions can be configured to, with the at least one processor (respectively 414, 424, and 434), cause a hardware apparatus (for example, user equipment 410 or eNodeB 420) to perform a process, such as any of the processes described herein (see, for example, FIGS. 1-3).

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, the user equipment 410 can include a user interface that is operable connected to the processor 414 and memory 415. That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device. Of course, there is no requirement that any of the devices include a user interface. For example, the user equipment 410 may be a machine to machine type communication device.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   informing, in a request, an authentication server regarding at least one type of network service requested by the user equipment;
   receiving a response from the authentication server in response to the request, the response including an indication of which one of the at least one type of network service is allowed for the user equipment;
   selecting, by a network device, a type of network service of the at least one type of network service to use with respect to the user equipment based on the response;
   attaching the user equipment to the network device based on the selected type of network service; and
   granting the mode to the user equipment when the authentication server indicates that the mode is permitted for the user equipment.

2. The method of claim 1, further comprising:
   receiving from a user equipment an access network identity indication, which implicitly or directly indicates the type of network service or service set requested by the user equipment,
   based on the prerequisite that the access network identity, in which said access network identity may directly or implicitly indicate to the user or the user equipment the type of network services available and offered by the network, is broadcasted to the user equipment, and
   based on the prerequisite that the user or user equipment selects access point based on the access network identity broadcasted by the access network to the user equipment.

3. The method of claim 2, wherein the receiving the access network identity includes receiving a service set identifier.

4. The method of claim 1, further comprising:
   advertising, to the user equipment, modes supported by a trusted wireless local area network, prior to informing the authentication server.

5. A method, comprising:
   receiving, at an authentication server, a request regarding at least one type of network service requsted by a user equipment;
   determining, by the authentication server based on subscriber information or configuration of the authentication server, whether the at least one type of network service requested by the user equipment, received in the request, is permitted for the user equipment;
   responding to the request with a successful authentication only when one or more mode of the at least one type of network service is permitted for the user equipment, wherein the response with the successful authentication includes an indication of which one of the at least one type of network service is permitted for the user equipment; and
   responding to the request with an unsuccessful authentication when no network service of the at least one type of network service is permitted for the user equipment.

6. The method of claim 5, further comprising:
   receiving the request, wherein receiving the request comprises receiving an authentication request.

7. An apparatus, comprising:
at least one processor; and
at least one memory including computer program code,
wherein the at least one memory and the computer program code are configured to, with the at least one processor, cause the apparatus at least to
inform, in a request, an authentication server regarding at least one type of network service requested by the user equipment,
receive a response from the authentication server in response to the request, the response including an indication of which one of the at least one type of network service is allowed for the user equipment,
select a type of network service of the at least one type of network service to use with respect to the user equipment based on the response,
attach the user equipment to the network device based on the selected type of network service, and
grant the mode to the user equipment when the authentication server indicates that the mode is permitted for the user equipment.

8. The apparatus of claim 7, wherein the at least one memory and the computer program code are configured to, with the at least one processor, cause the apparatus at least to receive from a user equipment an access network identity, and to inform the authentication server based on the access network identity.

9. The apparatus of claim 8, wherein the access network identity comprises a service set identifier.

10. The apparatus of claim 7, wherein the at least one memory and the computer program code are configured to, with the at least one processor, cause the apparatus at least to advertise, to the user equipment, modes supported by a trusted wireless local area network, prior to informing the authentication server.

11. An apparatus, comprising:
at least one processor; and
at least one memory including computer program code,
wherein the at least one memory and the computer program code are configured to, with the at least one processor, cause the apparatus at least to
receive a request regarding at least one type of network service requested by a user equipment;
determine, based on subscriber information or configuration of the apparatus, whether the at least one type of network service requested by the user equipment, received in the request, is permitted for the user equipment;
respond to the request with a successful authentication only when one or more mode of the at least one type of network service is permitted for the user equipment, wherein the response with the successful authentication includes an indication of which one of the at least one type of network service is permitted for the user equipment; and
respond to the request with an unsuccessful authentication when no mode of the at least one type of network service is permitted for the user equipment.

12. The apparatus of claim 11, wherein the request comprises an authentication request.

13. A computer program product, embodied on a non-transitory computer-readable medium, the computer program product configured to control a processor to
inform, in a request, an authentication server regarding at least one type of network service requested by the user equipment;
receive a response from the authentication server in response to the request, the response including an indication of which one of the at least one type of network service is allowed for the user equipment;
select a type of network service of the at least one type of network service to use with respect to the user equipment based on the response;
attach the user equipment to a network device based on the selected type of network service; and
grant the mode to the user equipment when the authentication server indicates that the mode is permitted for the user equipment.

* * * * *